United States Patent [19]

Yung et al.

[11] Patent Number: 5,561,693
[45] Date of Patent: Oct. 1, 1996

[54] SELECTIVE CALL RECEIVER WITH BATTERY SAVING FEATURES AND METHOD THEREFOR

[75] Inventors: Weng F. Yung; Dee N. Ong, both of Singapore, Singapore

[73] Assignee: Motorola, Inc., Schaumburg, Ill.

[21] Appl. No.: 283,426

[22] Filed: Aug. 1, 1994

[51] Int. Cl.$^6$ ................................................. H04L 23/00
[52] U.S. Cl. ............................ 375/377; 375/316; 370/84; 455/343
[58] Field of Search .................................... 375/377, 316; 370/84; 455/343, 38.3; 340/825.44, 825.14, 825.2

[56] References Cited

U.S. PATENT DOCUMENTS

| | | | |
|---|---|---|---|
| 5,049,875 | 9/1991 | DeLuca et al. | 370/84 |
| 5,077,758 | 12/1991 | DeLuca et al. | 375/95 |
| 5,095,498 | 3/1992 | DeLuca et al. | 375/94 |
| 5,376,929 | 12/1994 | Rakolta et al. | 340/825.21 |
| 5,381,133 | 1/1995 | Exhart et al. | 455/343 |

*Primary Examiner*—Stephen Chin
*Assistant Examiner*—Hai H. Phan
*Attorney, Agent, or Firm*—Keith A. Chanroo

[57] ABSTRACT

A selective call receiver (10) comprising a processor (108) that couples to a receiver circuit (102), a baud rate detector (106) and a memory device (110). The processor (108) activates the baud rate detector (106) that includes a plurality of registers to perform two baud rate detections to confirm a selective call signal before further processing. When a first baud rate detection detects the selective call signal, the processor (108) combines the results of this first baud rate detection and a plurality of predetermined baud rate parameters to provide a second plurality of predetermined baud rate parameters. The processor (108) then activates the baud rate detector (106) to perform a second baud rate detection using the second plurality of predetermined baud rate parameters. Based on the results of the second baud rate detection, the processor (108) determines whether to continue processing the selective call signal.

17 Claims, 2 Drawing Sheets

SELECTIVE CALL RECEIVER WITH BATTERY SAVING FEATURES AND METHOD THEREFOR

FIELD OF THE INVENTION

This invention relates in general to selective call receivers and in particular to a method and apparatus for battery saving in a selective call receiver.

BACKGROUND OF THE INVENTION

Selective call receivers are typically battery powered to allow for portability and convenience. Reducing the current consumption of a selective call receiver helps to increase its operating duration which is limited by the energy content of batteries.

In a selective call receiver, a large portion of available current is consumed by its receiver circuit. To reduce the current consumption of the receiver circuit, current saving schemes are implemented that selectively activate and inactivate the receiver circuit.

Determining when to activate or inactivate the receiver circuit of a selective call receiver requires proper processing of a selective call signal intended for the selective call receiver so as to not miss any selective call messages for the selective call receiver. Inadvertently activating the receiver circuit causes unnecessary operation of the selective call receiver, and hence, a wastage of current. This further shortens the battery life of the selective call receiver unnecessarily.

Inadvertently activating the receiver circuit of a selective call receiver is known in the art as falsing. Falsing occurs, for example, when noise is wrongly detected as a selective call signal and thereby activating the receiver circuit of the selective call receiver.

Thus, what is needed is a method and apparatus to reduce current consumption in selective call receivers by reliably determining when to continue activating the receiver circuit for processing the selective call signal.

SUMMARY OF THE INVENTION

In carrying out the objects of the present invention in one form, there is provided a method for battery saving in a selective call receiver having a receiver circuit for receiving and demodulating a selective call signal, a baud rate detector for detecting the selective call receiver in at least one predetermined baud rate, a processor for controlling the receiver circuit and the baud rate detector. The method comprises the steps of performing a second baud rate detection using the results of a first baud rate detection and inactivating the receiver circuit when the second baud rate detection does not detect the selective call signal.

DETAILED DESCRIPTION OF THE INVENTION

Figure 1:
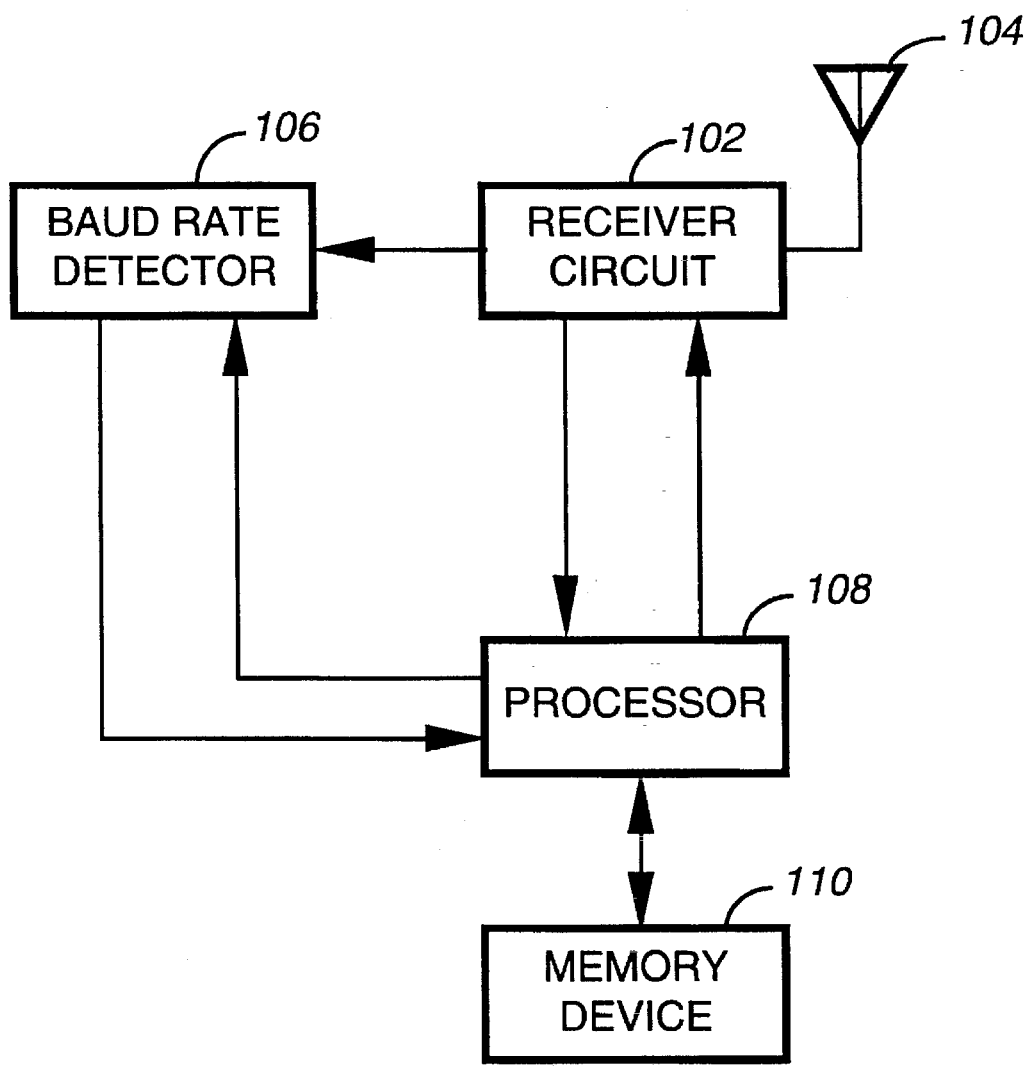
FIG. 1 is a block diagram of a selective call receiver in accordance with a preferred embodiment of the present invention.

In accordance with a preferred embodiment of the present invention, FIG. 1 shows a block diagram of a selective call receiver 10. The selective call receiver 10 comprises a receiver circuit 102 coupled to an antenna 104, a baud rate detector 106, and a processor 108. The processor 108 further couples to a memory device 110 that stores a plurality of selective call signal parameters including a plurality of predetermined baud rate parameters for a selective call signal. In processing the selective call signal, the processor 108 selectively activates and inactivates the receiver circuit 102 based on the results from at least one baud rate detection performed by the baud rate detector 106. Baud rate detections are activated by the processor 108 in response, for example, to a predetermined time sequence.

Detecting the selective call signal requires the baud rate detector to determine one of a plurality of predetermined baud rates at which the selective call signal is received. Examples of baud rate detection for a selective call signal are disclosed in U.S. Pat. Nos. 5,077,758 and 5,095,498.

Baud rate detection enables the processor 108 to determine whether a selective call signal is intended for the selective call receiver 10 before processing the selective call signal. Hence, when noise is wrongly detected initially, the processor 108 will save on current consumption by the selective call receiver 10 by not further processing the noise when the baud rate detection fails. A substantial savings in current consumption is thus possible when the processor 108 inactivates, for example, the receiver circuit 102.

Figure 2:
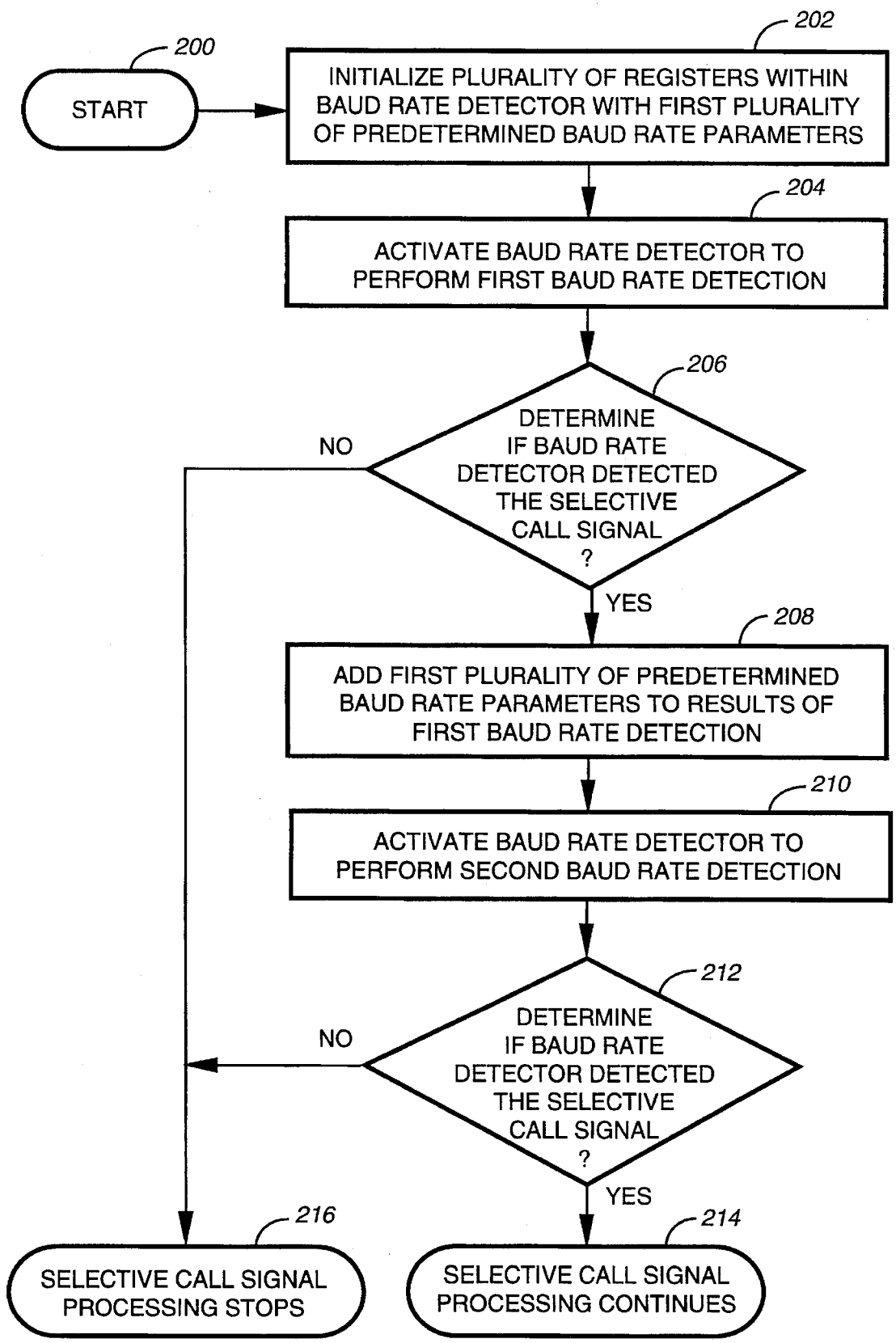
FIG. 2 is a flow chart of the operation of the processor shown in FIG. 1 in accordance with the preferred embodiment of the present invention.

In accordance with the preferred embodiment of the present invention, FIG. 2 shows a flow chart of the operation of the processor 108 of FIG. 1. A method 20 for battery saving in the selective call signal begins when the processor initializes a plurality of registers within the baud rate detector with a first plurality of predetermined baud rate parameters 202. The first plurality of predetermined baud rate parameters is extracted from the plurality of selective call signal parameters stored in the memory device 110.

Using the first plurality of predetermined baud rate parameters, the processor 108 then activates the baud rate detector 106 to perform a first baud rate detection 204. Next, the processor 108 determines whether the baud rate detector detected the selective call signal 206. Thereafter, and when the first baud rate detection has detected the selective call signal, the method 20 then combines the first plurality of predetermined baud rate parameters and the results of the first baud rate detection 208. Adding the first plurality of predetermined baud rate parameters and the results of the first baud rate detection provides the baud rate detector 106 with a second plurality of predetermined baud rate parameters. Using this second plurality of predetermined baud rate parameters, the processor 108 then activates the baud rate detector to perform a second baud rate detection 210.

Herein, the selective call receiver 10 reduces falsing substantially by performing the second baud rate detection 210. As is known in the art, the first baud rate detection does not eliminate the possibility of a falsing that keeps the receiver circuit 102 activated. One of the points of novelty in performing the second baud rate detection 210 is that it enhances the likelihood that the selective call signal receiver 10 is processing a desired selective call signal. Battery power is therefore not wasted.

In determining whether the selective call signal has been detected in step 206, the processor 108 stops processing the selective call signal 216 when the baud rate detector 106 does not detect the selective call signal in the first baud rate detection. In stopping the processing, the receiver circuit 102 is inactivated, and hence, current consumption by the receiver circuit for a wrongly identified selective call signal ceases. Likewise, at step 212 the receiver circuit 102 is similarly inactivated when the selective call signal is not detected in the second baud rate detection. In both steps 206, 212, the processor 108 stops processing the selective call signal and this, therefore, prevents falsing to occur. The falsing can be a result of, for example, signal noises or other selective call signals transmitted at a different baud rate for a different group of selective call receivers.

An advantage of the present invention is that the second baud rate detection more reliably confirms the selective call signal before any subsequent processing by the processor 108. By taking the results of the first baud rate detection to perform the second baud rate detection, a criterion for noise to also pass the second baud rate detection is established. This criterion is more stringent compared to having only the first baud rate detection detect the selective call signal. In statistical terms, the probability of falsing for conventional methods of baud rate detection is measured to be about seven per cent. In performing the second baud rate detection 210, the probability of falsing has been reduced to a squared factor of the seven per cent (or about half a per cent). A result of performing the second baud rate detection in the method 20 is that the falsing rate is thus reduced.

Furthermore, having passed the first baud rate detection, it will be easier for the selective call signal to pass the second baud rate detection when the selective call signal is a desired selective call signal. Using the results of the first baud rate detection to derive the second plurality of predetermined baud rate parameters for performing the second baud rate detection provides a better sensitivity compared to performing two distinctive baud rate detections for the selective call signal. Hence, the sensitivity of the selective call receiver 10 is thereby improved by performing the second baud rate detection in accordance with the present invention.

When both the first baud rate detection and the second baud rate detection detects the selective call signal, the processor 108 then continues processing the selective call signal 214. Following step 214, the selective call signal can therefore be more correctly identified before any subsequent processing. This saves an operating current consumption of the selective call receiver 10, and in particular, the current consumption by the receiver circuit 102.

By now it should be appreciated that there has been provided a novel method and apparatus to reduce current consumption in the selective call receiver 10 by correctly identifying a desired selective call signal before fully processing the desired selective call signal intended for the selective call receiver 10.

We claim:

1. A method for battery saving in a selective call receiver having a receiver circuit for receiving and demodulating a selective call signal, a baud rate detector for detecting the selective call receiver in at least one predetermined baud rate, a processor for controlling the receiver circuit and the baud rate detector, the method comprising the steps of:

initializing a plurality of registers in the baud rate detector in accordance with a first plurality of predetermined baud rate parameters stored within a memory means coupled to the processor;

performing a first baud rate detection using the first plurality of predetermined baud rate parameters;

combining, thereafter when the selective call signal is detected in the first baud rate detection, the results of the first baud rate detection and the first plurality of predetermined baud rate parameters to provide a second plurality of predetermined baud rate parameters;

performing a second baud rate detection using the second plurality of predetermined baud rate parameters; and inactivating the receiver circuit when the second baud rate detection does not detect the selective call signal.

2. The method of claim 1 further comprising the step of updating the plurality of registers in the baud rate detector with the second plurality of predetermined baud rate parameters.

3. The method of claim 2 further comprising the step of performing the second baud rate detection using the second plurality of predetermined baud rate parameters.

4. The method of claim 1 wherein the step of combining comprises the step of adding the results of the first baud rate detection to the first plurality of predetermined baud rate parameters to provide the second plurality of predetermined baud rate parameters.

5. The method of claim 1 further comprising the step of keeping the receiver circuit activated when the selective call signal is detected in the second baud rate detection.

6. A selective call receiver for receiving a selective call signal after performing at least one predetermined baud rate comprising:

a receiver circuit for receiving and demodulating the selective call signal;

a baud rate detector coupled to the receiver circuit for performing at least one baud rate detection of the selective call signal;

a memory device for storing a plurality of selective call signal parameters including a first plurality of predetermined baud rate parameters; and a processor, coupled to the receiver circuit, the baud rate detector, and the memory device, wherein the processor initializes the baud rate detector with the first plurality of predetermined baud rate parameters to perform a first baud rate detection and combines the first plurality of predetermined baud rate parameters and the results of the first baud rate detection to thereby provide a second plurality of predetermined baud rate parameters for a second baud rate detection when the selective call signal is detected in the first baud rate detection, and further wherein the processor inactivates the receiver circuit when the second baud rate detection does not detect the selective call signal.

7. The selective call receiver of claim 6 and further wherein the processor combines the first plurality of predetermined baud rate parameters and the results of the first baud rate detection by adding the first plurality of predetermined baud rate parameters to the results of the first baud rate detection to provide the second plurality of predetermined baud rate parameters.

8. The selective call receiver of claim 7 and further wherein the processor updates the baud rate detector with the second plurality of predetermined baud rate parameters.

9. The selective call receiver of claim 8 and further wherein the processor activates the baud rate detector to perform the second baud rate detection after updating the baud rate detector with the second plurality of predetermined baud rate parameters.

10. The selective call receiver of claim 6 and further wherein the processor keeps the receiver circuit activated when the selective call signal is detected in the second baud rate detection.

11. A selective call receiver for receiving a selective call signal having at least one predetermined baud rate comprising:

a receiver circuit for receiving and demodulating the selective call signal;

a baud rate detector having a plurality of registers and coupled to the receiver circuit for performing at least one baud rate detection of the selective call signal;

a memory device for storing a plurality of selective call signal parameters including a first plurality of predetermined baud rate parameters; and a processor, coupled to the receiver circuit, the baud rate detector, and the memory device, and wherein the processor, when the selective call signal is detected in the first baud rate detection, combines the results of a first baud rate detection and the first plurality of predetermined baud rate parameters to perform a second baud rate detection to determine whether to inactivate the receiver circuit.

12. The selective call receiver of claim 11 wherein the processor initializes the plurality of registers with the first plurality of predetermined baud rate parameters to perform the first baud rate detection, and further wherein the processor combines the first plurality of predetermined baud rate parameters and the results of the first baud rate detection to provide a second plurality of predetermined baud rate parameters.

13. The selective call receiver of claim 12 and further wherein the processor combines the first plurality of predetermined baud rate parameters and the results of the first baud rate detection by adding the first plurality of predetermined baud rate parameters to the results of the first baud rate detection to provide the second plurality of predetermined baud rate parameters.

14. The selective call receiver of claim 13 and further wherein the processor updates the plurality of registers with the second plurality of predetermined baud rate parameters.

15. The selective call receiver of claim 14 and further wherein the processor activates the baud rate detector to perform the second baud rate detection after updating the plurality of registers with the second plurality of predetermined baud rate parameters.

16. The selective call receiver of claim 15 and further wherein the processor inactivates the receiver circuit when the selective call signal is not detected in the second baud rate detection.

17. The selective call receiver of claim 15 and further wherein the processor keeps the receiver circuit activated when the selective call signal is detected in the second baud rate detection.

* * * * *